Aug. 21, 1956 R. SAUNDERS, JR., ET AL 2,760,098
ELECTROSTATIC FOCUSED GUN FOR CATHODE RAY TUBE
Filed May 8, 1951

INVENTORS
Romaine Saunders, Jr. &
Lloyd E. Swedlund
BY
William A. Zalesak
ATTORNEY United States Patent Office 2,760,098
Patented Aug. 21, 1956

1 2

2,760,098

ELECTROSTATIC FOCUSED GUN FOR CATHODE RAY TUBE

Romaine Saunders, Jr., Mount Joy, and Lloyd E. Swedlund, Lancaster, Pa., assignors to Radio Corporation of America, a corporation of Delaware Application May 8, 1951, Serial No. 225,126

7 Claims. (Cl. 313—78)

This invention is directed to a cathode ray tube and more especially to an electrostatic focusing gun structure for a television picture viewing tube.

A television picture tube is one having an electrode structure designed and arranged to form a cathode ray beam, which is focused and scanned over a fluorescent screen. Practically all such television picture tubes have used a focusing magnet mounted on the outside of the tubular neck portion of the envelope, and which is used to focus the electron beam of the tube to a fine spot on the fluorescent screen. The focusing magnet may be either an electromagnet with a copper winding, or an Alnico type permanent magnet. Both of these constructions use critical metals, such as copper, cobalt, and nickel. By eliminating a focusing magnet exteriorly of the tube, there is avoided the need for any mechanical supporting device for the magnet. Furthermore, an exterior focusing magnet requires critical adjustment to obtain optimum tube performances. Such adjustment is beyond the skill of the average serviceman. Accordingly, it would be desirable to provide a picture tube without these disadvantages.

An alternative method of beam focus is the use of electrostatic focusing electrodes within the tube envelope. Electrostatic focusing electrodes have been proposed and used to a small extent in directly viewed picture tubes, but have been used extensively only in oscilloscope cathode ray tubes or in projection type cathode ray tubes for television. Electrostatic focus is provided by electrodes confined within the cathode ray tube neck. The electrostatic focusing field is thus, inherently smaller in diameter than a corresponding magnetic focusing field provided by an external focusing coil mounted on the tube neck.

The electron beam in present television picture tubes is large, in comparison to the size of beams used in electrostatically focused and electrostatically deflected tubes. Thus, picture tubes, utilizing electrostatic focusing and operating at normal voltages have a focusing lens field which is small compared to the beam diameter. Thus, the beam will pass through edge portions of the lens field which have excessive aberration. Also, difficulties arise in beam focusing due to the over-lapping of the magnetic deflection fields into the electrostatic focusing fields. Thus, electrostatic focused television picture tubes, using wide beam deflection angles of 70° and more, are often characterised by poor focus, as the scanning fields are stronger and cause the beam to pass through portions of the focusing field which have excessive aberration.

The economical use of electrostatic focus for the main focusing field, in directly viewed television picture tubes, requires essentially zero beam current to the focusing electrode, and an electrode structure which can be easily manufactured in quantity production. Low beam current to the focusing electrode is necessary in order to be able to provide an adjustable voltage source, without serious loss of high voltage energy. Such a voltage source would be, for example, a high resistance bleeder. It is also necessary to prevent loss of grid drive sensitivity by bypassing beam current into a masking aperture. Although the use of a conductive coating on the neck of the tube has been used as an electrostatic focusing electrode in the past, it requires the use of a neck with good inside roundness which is costly to achieve. It is desirable to avoid excessive cost and to use constructions which have been designed for low-cost manufacture. A further factor affecting cost is the use of not only similar parts as those used in magnetic focused tubes, but also the ability to use the same exhaust machines, so that both types can be made simultaneously, as needed. An ion trap is needed to avoid the ion spot produced on the fluorescent screen of electrostatic focus tubes, such as the RCA 12AP4 manufactured in 1940 and 1941. In the past, attempts to use ion traps with electrostatic focus guns has resulted in poorer beam focus than that in corresponding magnetic focus tubes with ion traps.

It is thus an object of the invention to provide an electrostatically focused cathode-ray tube for television in which a large diameter beam may be effectively used at normal operating voltages.

It is another object of the invention to provide a cathode-ray tube for television in which the electron beam is electrostatically focused, and wherein the focusing fields are effectively spaced from the deflection fields of the tube.

It is a further object of the invention to provide an electrostatically focused picture tube, in which the negative ions of the beams are effectively trapped.

It is another object of the invention to provide a cathode-ray tube for television having a wide beam deflection angle and wherein the beam is electrostatically focused on the fluorescent screen.

In accordance with the invention, there is provided an electron gun which has a focusing section comprising a pair of electrode members operated at a common high positive potential and a less positive ring electrode positioned therebetween. The pair of electrode members are formed with recessed or cupped portions to provide a large diameter focusing field between them and the ring electrode. The focusing section of the gun is mounted on the tube axis. The electron source of the gun is mounted offset from the tube axis to provide ion trapping within the gun structure.

Figures 1, 2, 3:
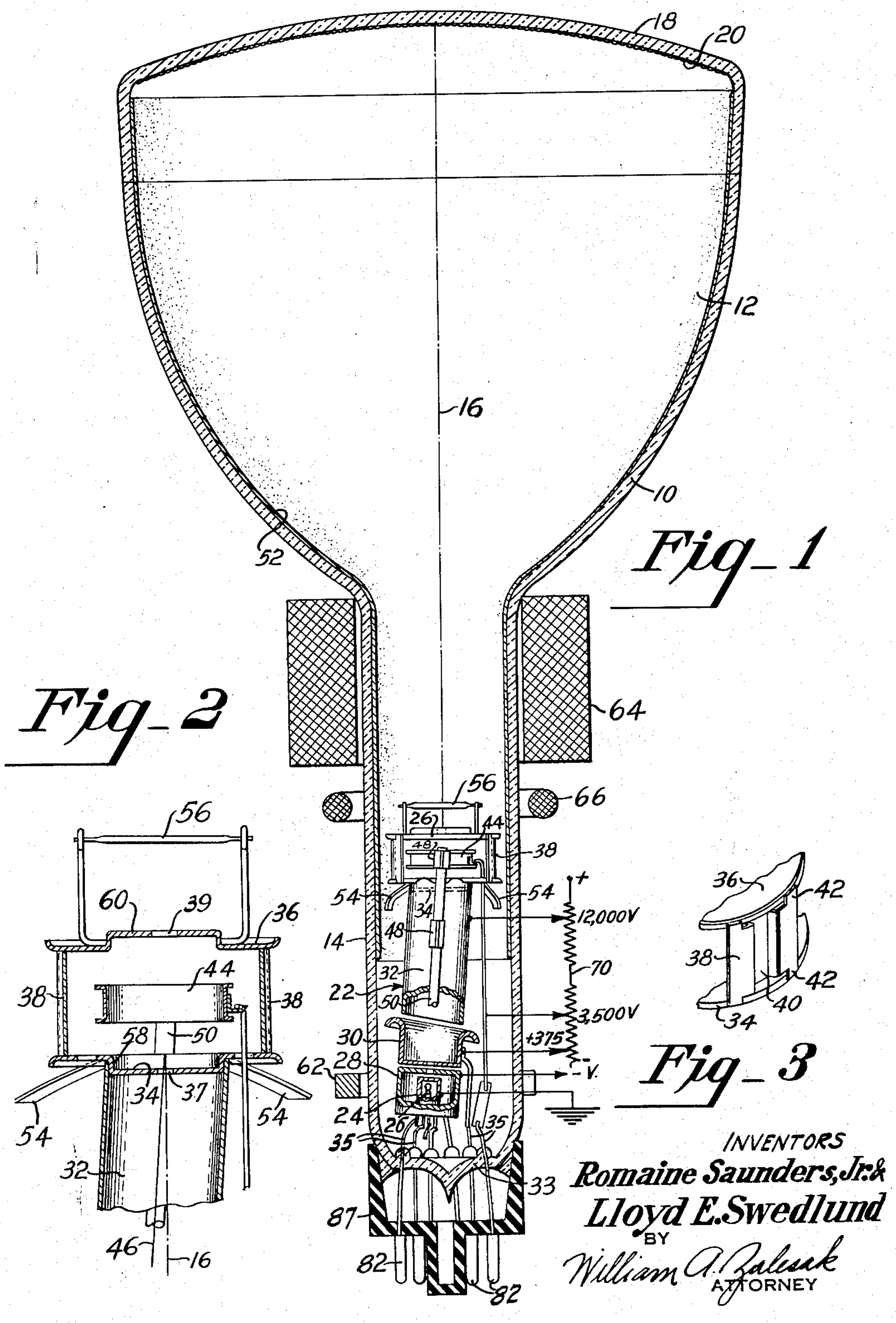
Figure 1 is a sectional view of a cathode ray tube including the novel gun structure according to the invention.
Figure 2 is a partial sectional view of the gun structure in the tube of Figure 1.
Figure 3 is a view of a spacer means used in the gun of Figure 1.

Figure 1 represents a cathode ray tube having an electrostatically focused electron gun made according to our invention and which has been found to operate successfully in television picture tubes. The gun structure of this tube was designed to provide certain operational characteristics which were not available in prior art structures. It was desirable to provide an electron gun structure which could be used effectively with large directly viewed cathode ray tubes in which the deflection angle was in the order of 70° to 90°. A prerequisite was also that of preventing screen burning due to negative ions striking the fluorescent screen. This necessitated a negative ion trapping means in the gun structure. Furthermore, it is desirable that for interchangeability in the television set the electron gun and hence the tube length be as short, if not shorter than conventional magnetically focused tubes. Yet the electrostatic gun must be one which can handle the large beam currents required in present television picture tubes.

In accordance with the invention, Figure 1 discloses a novel electron gun design, which effectively focuses a large electron beam by an electrostatic lens. The gun structure also includes a negative ion trapping means. The cathode ray tube is formed of an envelope 10, which may be entirely of glass or partially glass and partially metal. Envelope 10 consists of a large bulb portion 12 and a tubular neck portion 14 mounted on a common axis 16. The large end portion of bulb 12 is closed by a glass face plate 18 coated on the inner surface thereof with a phosphor layer 20, which provides a luminescence when struck by high velocity electrons. Such a fluorescent screen may be blue fluorescing zinc sulfide and yellow fluorescing zinc cadmium-sulfide mixed in the desired proportions to provide a white luminescence.

Within the neck portion 14 is mounted an electron gun structure 22 for forming and focusing an electron beam on the fluorescent screen 20. The electron gun 22 includes a beam forming portion having a source of electron emission, which is a cathode electrode 24 formed of a short metal tube closed at the end facing the screen 20. The closed end of cathode 24 which forms an electron emitting portion is coated in a well-known manner with thermionic emitting material such as the mixed oxides of barium and strontium. A filament 26 within the tubular cathode 24 heats the cathode to thermionic emission during tube operation. Enclosing cathode 24 is a control grid electrode 28 having a closed end portion with a small aperture positioned over the electron emitting surface of cathode 24. Spaced from control electrode 28 is an accelerating grid structure 30 formed as a cup, or thimble-shaped electrode, for drawing the electron emission from cathode 24 through the aperture of control grid 28. A second accelerating grid 32 is mounted closely spaced from grid 30 and is formed as a tubular cylinder, as shown in Figures 1 and 2.

In accordance with the invention, electron gun 22 is provided with a beam focusing portion. This includes the end of accelerating grid 32, toward screen 20 which is closed by a cup-shaped plate or disc 34 having an aperture 37 at its center. Spaced from plate 34 is a second cup shaped disc 36 having an aperture 39 at its center. Discs 34 and 36 are spaced apart by spacer elements 38 each of which have an indented portion 40 positioned between plates 34 and 36 to hold them apart. Spacers 38 also include projecting tab portions 42, which are respectively welded to the rims of the plate portions 34 and 36. These spacers 38 thus, automatically maintain the distance between plates 34 and 36, as well as, form a rigid mounting of plate 36 on the accelerating electrode 32. Spacers 38 are of metal and thus tie plate 36 electrically to electrode 32. Positioned intermediate plates 34 and 36 is a focusing grid or electrode 44. As is shown in Figure 2, electrode 44 consists essentially of a short tube or ring.

Beam forming electrodes 28, 30 and 32 are mounted on a common axis 46 (Figure 2) by metallic support members 48 projecting out from each respective electrode and securely fixed or clamped about common ceramic support rods 50. This mounting means is more clearly shown in United States Patent 2,335,818 to Trumbull et al., for example. Focusing electrode 44 is mounted on the ends of the rods 50. Apertured plates 34 and 36, as well as the tubular electrode 44, are each mounted at an angle to axis 46 and coaxially with tube axis 16. In a successfully operated tube of the type described, axis 46 is at an angle of substantially three degrees to axis 16. In this manner, the beam forming portion of the electron gun 22, including the electron emitting area of cathode 24, as well as electrodes 28, 30 and 32, is mounted offset from the beam focusing gun portion, formed by electrodes 34, 44 and 36.

A collector electrode, consisting of a conductive wall coating 52, extends from a point adjacent screen 22 of the inner surface of the bulb portion 12 into the neck portion 14 to a point below the electrode plate 34. Bulb spacers 54 serve to accurately center the end of gun 22 within the tube neck 12, as well as to electrically tie accelerating electrode 32 to the collector wall coating 52. Mounted on the end of the gun structure 22 are getter tabs 56 to provide a source of gettering material after tube has been exhausted. The electrode structure is fixed to a press or stem portion 33 by leads 35 sealed through the press 33. A base member 87 is cemented to the end of the envelope portion 14. Leads 35 pass through base 87 and are soldered to base pins 82 fixed to base 87.

The operation of the gun structure, shown in Figures 1 and 2, is such that the electron emission from the cathode 24 is formed into an electron beam by control grid 28 and accelerating grid 30. During tube operation, the control grid 28 is given a bias, negative to the potential of the cathode 24, in order to cut off the electron emission from the cathode through the aperture of grid 28. Signal pulses drive the control grid 28 in a positive direction to permit electrons to pass through grid 28 and in quantities proportional to the signal voltages. The accelerating grid 30 is operated at around 300 volts positive relative to cathode potential, which may be considered as ground. The operating potential of grids 28 and 30 bunch the electron trajectories in a manner that they tend to converge to a point at which the beam has a minimum cross-sectional area. This point is known as the first cross-over and is adjacent to the aperture in the end wall of accelerating electrode 30. The electrons, as they enter into the second accelerating grid 32, which is operated at around 12,000 volts, are diverging from each other and the gun axis 46. The electrostatic field between accelerating grids 30 and 32 provides a small amount of focusing of the electrons, but, as the electrons pass down the tubular portion of electrode 32, they still remain divergent. Electrode 44 is operated at around 3,500 volts positive relative to cathode potential. The electrostatic fields set up between electrode 44 and the more positive electrode plate portions 34 and 36 constitute an electrostatic lens field, which is of a nature to cause the electron paths to converge to a small point of focus on fluorescent screen 20.

Previously, electrostatically focused guns have used flat apertured plate electrodes corresponding to electrodes 34, 44 and 36. However, the size of the focusing field, between such plate electrodes, is determined by the apertures in the respective plates which are of a small order. Small diameter focusing fields have proved satisfactory for the very thin electron beams used in oscillograph tubes. However, with the comparatively large electron beams, required for a television picture tube, such small diameter focusing fields can not be used satisfactorily. Poor focus results, as portions of the beam pass through the edge of the fields, which have an unsatisfactory amount of aberration.

As shown in Figure 2, the gun structure, in accordance with the invention, is designed to provide a larger diameter focusing field. Focusing electrode 44 is formed as a large open ring substantially having the same diameter as tubular portion 32. The adjacent end wall portion 34 of electrode 32 is formed from a plate having a recessed portion 58 or shallow cup in which the depth of the cup is much less than the cup diameter as shown in Figure 2, for example. Also electrode plate 36 is provided with a recess portion 60. These recessed portions 58 and 60 extend in opposite directions and provide short tubular or annular portions coaxial with electrode 44. This arangement provides a much larger diameter focusing field than would be possible, if electrodes 34, 44 and 36 were respectively flat apertured plates. The center of this focusing field presents to the beam of the tube little aberration to cause undue distortion of the beam focus at the target screen 20.

Also, in accordance with the invention, the tubular portion of electrode 32 is made shorter than in the conventional corresponding electromagnet focus gun, such as that disclosed in copending application of Lloyd E. Swedlund, Serial No. 130,775, filed December 2, 1949. Thus, the beam electrons have less divergence, when they enter the focusing field beyond plate 34. This provides an electrostatically focused gun structure having an overall length, no more than that of the corresponding magnetically focused gun.

It is known, that in cathode ray tubes of this type, there is formed in the tube, near or at the cathode, negatively charged gas ions. These negative ions mix with the beam and are accelerated with the electrons of the beam to strike the fluorescent screen at high velocities to produce a screen burning or browning after a period of time. To prevent screen burning by negative ion bombardment, electron guns for television tubes have been designed with ion traps within the gun structure. In the structure of Figure 1, the ion trap is provided by cutting the adjacent ends of tubular electrodes 30 and 32 at an angle, in the order of 10°, to the common axis 46 of the electrodes. This provides an electron lens between electrodes 30 and 32, which is non-symmetrical with reference to the electron beam path along axis 46. Both the off-set arrangement of the gun, as well as the unsymmetrical lens, deflect the electron beam from its path along axis 46 toward axis 16 of the tube envelope. In the region where the electron beam intercepts axis 16, a magnetic field is provided by an external magnet 62 to align the electrons of the beam along axis 16. For this purpose, the effect of the field of magnet 62 on the electrons of the beam is in a direction opposite to the effect on the beam of the lens field between electrodes 30 and 32. As the negative ions within the beam have a larger mass, they are little affected by the field of magnet 62 and will continue in their deflected path to strike the opaque portions of electrodes 32 and 34. The electrons of the beam, having been aligned with axis 16, will pass down the tube axis through plate 34 into the focusing section of the gun. As plates 34 and 36, as well as focusing electrode 44 are mounted on the common axis 16, the electron beam will pass through the center of the focusing field of these electrodes.

It is an advantage to provide ion trapping prior to the passage of the beam electrons through the final focusing field. If the focusing field were part of the ion trap, the off-axis beam would not pass through the center of the focusing field. The arrangement, shown in Figure 1, provides the optimum focusing of the beam electrons. The passage of the beam along the lens axis provides a minimum aberration effect.

The electron beam is scanned over the surface of the fluorescent screen 20 by two pairs of coils positioned in a neck yoke 64. The coils of each pair are connected in series and are positioned on opposite sides of the tube neck 14, and coaxially to each other. The axis of each pair is at right angles to that of the other pair. Coils of each pair are connected to sources of saw tooth voltages to provide line and frame scansion of the beam over fluorescent screen 20. Such a deflection system is well known in the prior art and does not constitute part of this invention.

It is desirable, with zero deflection, that the beam strike the center of fluorescent screen 20. Normally, however, the beam will often strike the fluorescent screen off-center. Means are necessary to properly center the beam for satisfactory tube operation. Because of the difficulties and expense of providing a centering of the beam in the center of the raster, by means of a direct current in the deflecting yoke windings, it has become universal practice in magnetic focus kinescopes to center the beam on the fluorescent screen by tilting or shifting the focusing magnet off-axis. Since this means is not available in electrostatic focus tubes, similar to that shown in Figure 1, beam centering can be provided by a small permanent magnet formed as a ring 66. Rotation of the ring around axis 16 of the tube and adjustment of its strength will provide beam centering.

Also, in accordance with the invention, electrode plate 34 is used to accurately center the beam in the focusing field in order to minimize aberration. Aperture 37 is accurately aligned with the focusing electrode 44. As aperture 37 is substantially 100 mils diameter, the beam is masked or reduced to the size of aperture 37 as it enters the focusing field. Also the "tilted" or offset gun together with the action of magnet 62 places the beam on axis 16 of the electrostatic lens electrodes. The mount spacers 54 quite accurately center plate 34 on axis 16 of the tube neck so that aperture 37 is substantially coaxial with the envelope 10. Thus, the electron beam portion passing through aperture 37 is automatically centered with the tube axis 16. By providing this masking of the electron beam at plate 34 instead of at plate 36, secondary electrons knocked out by the beam from the edge of aperture 37 are turned back to electrode 32 by the negative field of focusing electrode 44. Thus, stray secondary electron emission does not pass down the tube to the fluorescent screen. Aperture 39 in electrode plate 36 is formed with a wider diameter than aperture 37 and, in the tube described, is substantially around 120 mils. This wider aperture 39 allows beam clearance, if the electron beam is slightly misaligned with axis 16. Also, plate 36 tends to box-in the focusing field of electrodes 34, 44, and 36 and thus, shields the fluorescent screen 20 from stray emission electrons originating between electrode 44 and the high potential electrodes 34 and 36.

In tubes requiring wide angle deflection, it is necessary to use stronger deflecting fields. These deflecting fields will penetrate into the focusing region of the electron gun and disturb the focusing of the electron beam. The space provided between the deflecting yoke and the gun electrode 36 minimizes this action and provides a region for use of the auxiliary centering magnet 66.

The design of the electrostatic focused gun structure of Figures 1 and 2 has several advantages. The focus performance of the gun does not depend on the user aligning a focusing magnet on the tube, but on the symmetry of the focusing electrodes built into the tube. By making the distance between the first cross-over and the focusing field shorter, the focus spot at the screen is correspondingly larger. However, the shorter gun provides a smaller beam diameter in the deflecting field. As the beam is deflected off the axis 16, the smaller diameter beam will be defocused less by the deflection fields than would a beam of larger diameter.

Also, the electrostatically focused gun can be readily arranged to provide automatic correction of focus, when the focusing electrode voltages change due to voltage changes on the supply line and to brightness adjustment changes. As shown in Figure 1, unipotential electrode plates 34 and 36, and electrode 44, which form the focusing field for the beam, are connected respectively to different points of a voltage divider 70. If the voltage across the terminals of divider 70 varies for any reason, the voltage of focusing electrode 44 will be proportional to that of electrode 34 and hence collector 52. Thus, this system provides a constant beam focus for variations in potential of collector 52.

From the foregoing it will be apparent that the present invention provides an improved electron gun structure and one having the improved described characteristic.

What is claimed is:

1. An electron lens structure comprising a tubular first electrode, a first closure member at one end of said first electrode, an annular focusing second electrode spaced from said first electrode insulated therefrom and substantially aligned therewith, a third electrode substantially aligned with said second electrode insulated therefrom and having a second closure member facing said tubular first electrode, said first and second closure members each having a flat central portion forming the bottom of a recess extending away from said annular focusing electrode, each of said flat central portions having an aperture through the center thereof, said recesses being substantially equal in size and having a depth less than the diameter of said tubular electrode and a conductive connection between said tubular electrode and said third electrode.

2. An electron gun for a cathode ray tube, said gun comprising a cathode electrode for providing a source of electrons, a plurality of focusing electrodes spaced from said cathode and mounted on a common axis, said focusing electrodes including a pair of spaced plate electrodes and an annular electrode spaced therebetween, said plate electrodes each formed as a shallow cup having a flat bottom wall with an aperture in the center of said bottom wall of each cup, the side walls of said cups extending in opposite directions toward each other from the respective bottom walls thereof a distance less than the diameter of each of said respective cups, and at least one other electrode between said focusing electrodes and said cathode for forming the electrons from said cathode into a beam.

3. An electron gun for a cathode ray tube, said gun comprising a cathode electrode for providing a source of electrons, a plurality of focusing electrodes spaced from said cathode, said focusing electrodes including a pair of electrodes each having a cup shaped portion in which the depth of said cup shaped portion is less than a diameter of said portion, said cup shaped portions extending in opposite directions facing each other, each of said electrode cup shaped portions having a bottom wall portion with a centrally located aperture therethrough, and a third apertured electrode spaced from and coaxially aligned between said pair of spaced focusing electrodes, the apertures of all of said focusing electrodes being aligned on a common axis, and at last one other electrode offset from said common axis and between said focusing electrodes and said cathode for forming the electrons from said cathode into a beam.

4. An electron gun for a cathode ray tube, said gun comprising a cathode electrode for providing a source of electrons, a plurality of focusing electrodes spaced from said cathode, said focusing electrodes including a pair of electrodes each having a cup shaped portion in which the depth of said cup shaped portion is less than a diameter of said portion, said cup shaped portions extending in opposite directions and facing each other, each of said electrode cup shaped portions having a bottom wall portion with a centrally located aperture therethrough, and a third apertured electrode spaced from and extending between said pair of spaced focusing electrodes, the apertures of all of said focusing electrodes being aligned on a common axis, and at least one other electrode offset from said common axis and between said focusing electrodes and said cathode for forming the electrons from said cathode into a beam along a path, said one other electrode having a portion adjacent to one of said pair of electrodes, said one other electrode portion being unsymmetrical relative to said beam path for providing an unsymmetric lens field between said one other electrode and said one of said pair of electrodes for directing said electron beam toward said common axis.

5. An electron gun for a cathode ray tube, said gun comprising a cathode electrode and a plurality of tubular beam forming electrodes in spaced relationship and spaced from said cathode for forming electron emission from said cathode into a beam, a plurality of beam focusing electrodes including the end of the beam forming electrode farthest from said cathode electrode and an electrode having an annular portion spaced from said electrode end and a tubular electrode spaced from and enclosing space between said annular electrode portion and said electrode end, said focusing electrodes mounted on a common axis, a first apertured wall closing said electrode end and recessed within said electrode end a distance less than the diameter of said electrode end, a second apertured wall closing said annular electrode portion and recessed in said annular portion from the end thereof facing said tubular electrode a distance less than the diameter of said annular electrode portion.

6. An electron gun for a cathode ray tube, said gun comprising a cathode electrode and a plurailty of tubular beam forming electrodes mounted on a first common axis and in spaced relationship and spaced from said cathode for forming electron emission from said cathode into a beam, a plurality of beam focusing electrodes including the end of the beam forming electrode farthest from said cathode electrode and an electrode having an annular portion spaced from said electrode end and a tubular electrode spaced from and enclosing space between said annular electrode portion and said electrode end, said focusing electrodes mounted on a second common axis offset from said first common axis, a first apertured wall closing said electrode end and recessed within said electrode end a distance less than the diameter of said electrode end, a second apertured wall closing said annular electrode portion and recessed in said annular portion from the end thereof facing said tubular electrode a distance less than the diameter of said annular electrode portion, said beam forming electrodes including a pair of adjacent electrode portions unsymmetrically disposed relative to said first common axis for providing an unsymmetrical lens field therebetween in said beam path for directing said electron beam toward said second axis.

7. The invention of claim 6, in which said pair of adjacent electrode portions include two spaced tubular electrodes coaxially mounted on said first common axis, one of the adjacent ends of said two tubular electrodes being cut at an angle to said common axis.

References Cited in the file of this patent

UNITED STATES PATENTS

| | | |
|---|---|---|
| 1,993,457 | Schlesinger | Mar. 5, 1935 |
| 2,058,914 | Rudenberg | Oct. 27, 1936 |
| 2,070,319 | Rudenberg | Feb. 9, 1937 |
| 2,147,558 | Schlesinger | Feb. 14, 1939 |
| 2,160,021 | Iams | May 30, 1939 |
| 2,211,613 | Bowie | Aug. 13, 1940 |
| 2,233,795 | Pensak | Mar. 4, 1941 |
| 2,289,071 | Ramo | July 7, 1942 |
| 2,295,530 | Gray | Sept. 15, 1942 |
| 2,354,287 | Zworykin et al. | July 25, 1944 |
| 2,363,359 | Ramo | Nov. 21, 1944 |
| 2,413,276 | Wolff | Dec. 24, 1946 |
| 2,452,919 | Gabor | Nov. 2, 1948 |
| 2,454,345 | Rudenberg | Nov. 23, 1948 |
| 2,465,406 | Taylor | Mar. 29, 1949 |
| 2,555,850 | Glyptis | June 5, 1951 |
| 2,562,242 | Pohle | July 31, 1951 |
| 2,565,533 | Szegho et al. | Aug. 28, 1951 |
| 2,628,326 | Bridges | Feb. 10, 1953 |
| 2,637,828 | Hoagland | May 5, 1953 |

OTHER REFERENCES

Article by Bowie: "Proceedings of the IRE," vol. 36, No. 12, December 1948, pp. 1482–1486.

"Industrial Electronics and Control," by R. G. Kloeffler, copyright 1949, published by John W. Wiley & Co., particularly p. 453, Fig. 2.